US006968817B2

(12) United States Patent
Hirowatari et al.

(10) Patent No.: US 6,968,817 B2
(45) Date of Patent: Nov. 29, 2005

(54) VALVE TIMING CONTROLLER FOR INTERNAL COMBUSTION ENGINE

(75) Inventors: Seiji Hirowatari, Toyota (JP); Masanao Idogawa, Toyota (JP); Masahiko Teraoka, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/984,804

(22) Filed: Nov. 10, 2004

(65) Prior Publication Data

US 2005/0098130 A1 May 12, 2005

(30) Foreign Application Priority Data

Nov. 12, 2003 (JP) ............................ 2003-382839

(51) Int. Cl.[7] .................................................. F01L 1/34
(52) U.S. Cl. .............................. 123/90.17; 123/90.15; 123/90.31
(58) Field of Search .......................... 123/90.17, 90.15, 123/90.31

(56) References Cited

U.S. PATENT DOCUMENTS 6,505,586 B1 1/2003 Masaomi et al.
6,732,689 B2 * 5/2004 Wada et al. ............. 123/90.17

FOREIGN PATENT DOCUMENTS

| | | |
|---|---|---|
| EP | 0 799 977 A1 | 10/1997 |
| EP | 0 859 130 A1 | 8/1998 |
| JP | 2001-055935 | 2/2001 |
| JP | 2001-317381 | 11/2001 |
| JP | 2002-161765 | 6/2002 |
| JP | 2004-346846 | 12/2004 |

* cited by examiner

*Primary Examiner*—Thomas Denion
*Assistant Examiner*—Zelalem Eshete
(74) *Attorney, Agent, or Firm*—Kenyon & Kenyon

(57) ABSTRACT

A controller for a lock mechanism of an engine valve that readily performs unlocking. A VVT changes the rotational phase of a camshaft relative to a pulley in accordance with the difference between the hydraulic pressure of an advance pressure chamber and the hydraulic pressure of a delay pressure chamber to vary the valve timing. The hydraulic pressure difference is set by a variable command value. A lock mechanism engages a lock pin with a lock hole when the rotational phase of the camshaft matches a lock phase. The VVT enters the most easily unlocking hydraulic pressure state when the command value is set at an unlocking command value. An ECU gradually increases the command value from a lower limit value to the unlocking command value and then to the upper limit value to unlock relative rotation of the camshaft.

14 Claims, 7 Drawing Sheets

M101

| Coolant temperature te (℃) | 70 | 80 | 85 | 95 | 115 |
|---|---|---|---|---|---|
| Predetermined speed r1 (rpm) | 800 | 1200 | 1300 | 1500 | 1700 |

VALVE TIMING CONTROLLER FOR INTERNAL COMBUSTION ENGINE

BACKGROUND OF THE INVENTION

The present invention relates to a controller for an internal combustion engine, and more particularly, to a controller for controlling in a variable manner the valve timing of engine valves that are opened and closed in accordance with the rotation of a camshaft.

To increase output or to improve emissions, an internal combustion engine for a vehicle or the like may be provided with a valve timing controller for optimally varying the valve timing of the internal combustion engine. Such a valve timing controller includes a rotor that rotates synchronously with a crankshaft of the internal combustion engine. The rotor accommodates a movable member, which is connected to a camshaft of the internal combustion engine, so that relative rotation of the movable member is enabled. An advance pressure chamber and a delay pressure chamber are defined on opposite sides of the movable member in the rotor. The advance and delay pressure chambers are connected to an oil pump through an oil control valve (OCV). The valve timing controller adjusts the duty ratio of the voltage supplied to the oil control valve to control the pressure difference between the pressure chambers.

The pressure difference between the pressure chambers changes in accordance with the voltage duty ratio. The movable member rotates relative to the rotor in accordance with the pressure difference between the pressure chambers. As a result, the rotational phase of the camshaft relative to the rotor changes to the advance side or the delay side. In this manner, the valve timing controller changes the rotational phase of the camshaft to vary the valve timing of the internal combustion engine.

Such a valve timing controller includes a lock mechanism for locking the camshaft at a rotational phase corresponding to a predetermined timing. This fixes the valve timing at a predetermined timing when the hydraulic pressure is low, such as when the engine is started. The lock mechanism includes, for example, a lock hole in the rotor and a lock pin arranged in the movable member. The lock mechanism further includes a spring for urging the lock pin toward the lock hole. The valve timing controller provided with such a lock mechanism locks the valve timing at a predetermined timing by an engagement of the lock pin and the lock hole. The valve timing controller separates the lock pin from the lock hole when changing the valve timing.

In such a lock mechanism, the abutment force acting between the peripheral surface of the lock pin and the wall of the lock hole decreases as the relative rotation force of the movable member relative to the rotor decreases. In this case, when the lock pin moves away from the lock pin, the friction force or resistance force that resists separation of the lock pin from the lock hole is small. The hydraulic pressure state in which the resistance force is smallest relative to the force acting to separate the lock pin from the lock hole is referred to a “hydraulic pressure state in which unlocking occurs most easily.”

To reach the “hydraulic pressure state in which unlocking occurs most easily,” the duty ratio of the voltage supplied to the OCV is set so that the valve timing is smoothly and quickly unlocked. However, the appropriate actual duty ratio for reaching the optimal hydraulic pressure state (hereinafter referred to as optimal duty ratio) is affected and is fluctuated by the intake pressure of the oil pump and the viscosity of the operating oil. Accordingly, when the optimal duty ratio is set as a fixed value, it is difficult to obtain the optimal hydraulic pressure state.

It may be considered that a holding duty ratio for holding the rotational phase of the camshaft is suitable for obtaining the optimal duty ratio. Accordingly, Japanese Laid-Open Patent Publication No. 2002-161765 describes grading the duty ratio of the voltage supplied to the OCV from the holding duty ratio so that the camshaft relatively rotates toward the advance side. Japanese Laid-Open Patent Publication No. 2002-161765 describes grading the voltage duty ratio from a limit value for relative rotation of the camshaft toward the delay side (lower limit value of variable range) via the holding duty ratio to a value for relative rotation the camshaft toward the advance side. In comparison to when the optimal duty ratio is a fixed value, this increases the possibility the voltage of the duty ratio supplied to the OCV matches the optimal duty ratio.

However, in Japanese Laid-Open Patent Publication No. 2002-161765, the duty ratio is graded from the holding duty ratio so that the camshaft relatively rotates toward the advance side. Thus, when the optimal duty ratio is a duty ratio that relatively rotates the camshaft toward the delay side, the duty ratio of the OCV does not match the optimal duty ratio. Further, in Japanese Laid-Open Patent Publication No. 2002-161765, the value at which grading starts may be set to the lower limit value of the variable range for the duty ratio of the OCV (one of the two limit values of the variable range). Accordingly, when the optimal duty ratio is relatively far from the lower limit value of the variable range (e.g., when the optimal duty ratio is close to the holding duty ratio), it takes a long time for the duty ratio to reach the optimal duty ratio from when grading is started. The prolonged grading delays unlocking, that is, delays the timing at which the varying of the valve timing starts.

SUMMARY OF THE INVENTION

The present invention provides a controller for quickly performing unlocking in a lock mechanism for engine valves.

One aspect of the present invention is a controller for controlling a valve timing of an internal combustion engine. The internal combustion engine includes a crankshaft and a camshaft. The controller has a variable mechanism including a rotor, rotated synchronously with the crankshaft, and an advance pressure chamber and a delay pressure chamber, which are defined between the rotor and the camshaft and which accommodate a fluid. The variable mechanism changes the rotational phase of the camshaft relative to the rotor in accordance with the difference between the pressure of the fluid in the advance pressure chamber and the pressure of the fluid in the delay pressure chamber so as to vary the valve timing. The pressure difference is set by a variable command value. The controller further has a lock mechanism including a projection, arranged on either one of the rotor and the camshaft, and a recess, arranged on the other one of the rotor and the camshaft. The lock mechanism engages the projection with the recess when the rotational phase of the camshaft matches a predetermined lock phase to lock relative rotation of the camshaft relative to the rotor. The variable mechanism enters a most easily unlocking fluid pressure state when the command value is set to an unlocking command value. A command value setting means gradually increases or decreases the command value from a first predetermined value to the unlocking command value and then to a second predetermined value so as to unlock the relative rotation of the camshaft.

A further aspect of the present invention is a controller for controlling a valve timing of an internal combustion engine. The internal combustion engine includes a crankshaft and a camshaft. The controller has a variable mechanism including a rotor, rotated synchronously with the crankshaft, and an advance pressure chamber and a delay pressure chamber, which are defined between the rotor and the camshaft and which accommodate a fluid. The variable mechanism changes the rotational phase of the camshaft relative to the rotor in accordance with the difference between the pressure of the fluid in the advance pressure chamber and the pressure of the fluid in the delay pressure chamber so as to vary the valve timing. The pressure difference is set by a variable command value. The controller further has a lock mechanism including a projection, arranged on either one of the rotor and the camshaft, and a recess, arranged on the other one of the rotor and the camshaft. The lock mechanism engages the projection with the recess when the rotational phase of the camshaft matches a predetermined lock phase to lock relative rotation of the camshaft with respect to the rotor. The fluid in the advance pressure chamber and the delay pressure chamber apply a first force to the projection to disengage the projection from the recess. The variable mechanism enters a state in which a value obtained by subtracting a second force, acting on the projection in a direction opposite the direction of the first force due to the relative rotation of the camshaft, from the first force when the command value is set to an unlocking command value. A control unit gradually increases or decreases the command value from a first predetermined value to the unlocking command value and then to a second predetermined value so as to unlock the relative rotation of the camshaft.

Another aspect of the present invention is a method for controlling a valve timing of an internal combustion engine. The internal combustion engine includes a crankshaft, a camshaft, a variable mechanism, and a lock mechanism. The variable mechanism includes a rotor, rotated synchronously with the crankshaft, and an advance pressure chamber and a delay pressure chamber, which are defined between the rotor and the camshaft and which accommodate a fluid. The variable mechanism changes the rotational phase of the camshaft relative to the rotor in accordance with the difference between the pressure of the fluid in the advance pressure chamber and the pressure of the fluid in the delay pressure chamber so as to vary the valve timing. The lock mechanism includes a projection, arranged on either one of the rotor and the camshaft, and a recess, arranged on the other one of the rotor and the camshaft. The lock mechanism engages the projection with the recess when the rotational phase of the camshaft matches a predetermined lock phase to lock relative rotation of the camshaft with respect to the rotor. The method includes setting the difference between the pressure of the fluid in the advance pressure chamber and the pressure of the fluid in the delay pressure chamber with a variable command value. The variable mechanism enters a most easily unlocking fluid pressure state when the command value is set to an unlocking command value. The method further includes gradually increasing or decreasing the command value from a first predetermined value to the unlocking command value and then to a second predetermined value so as to unlock the relative rotation of the camshaft.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
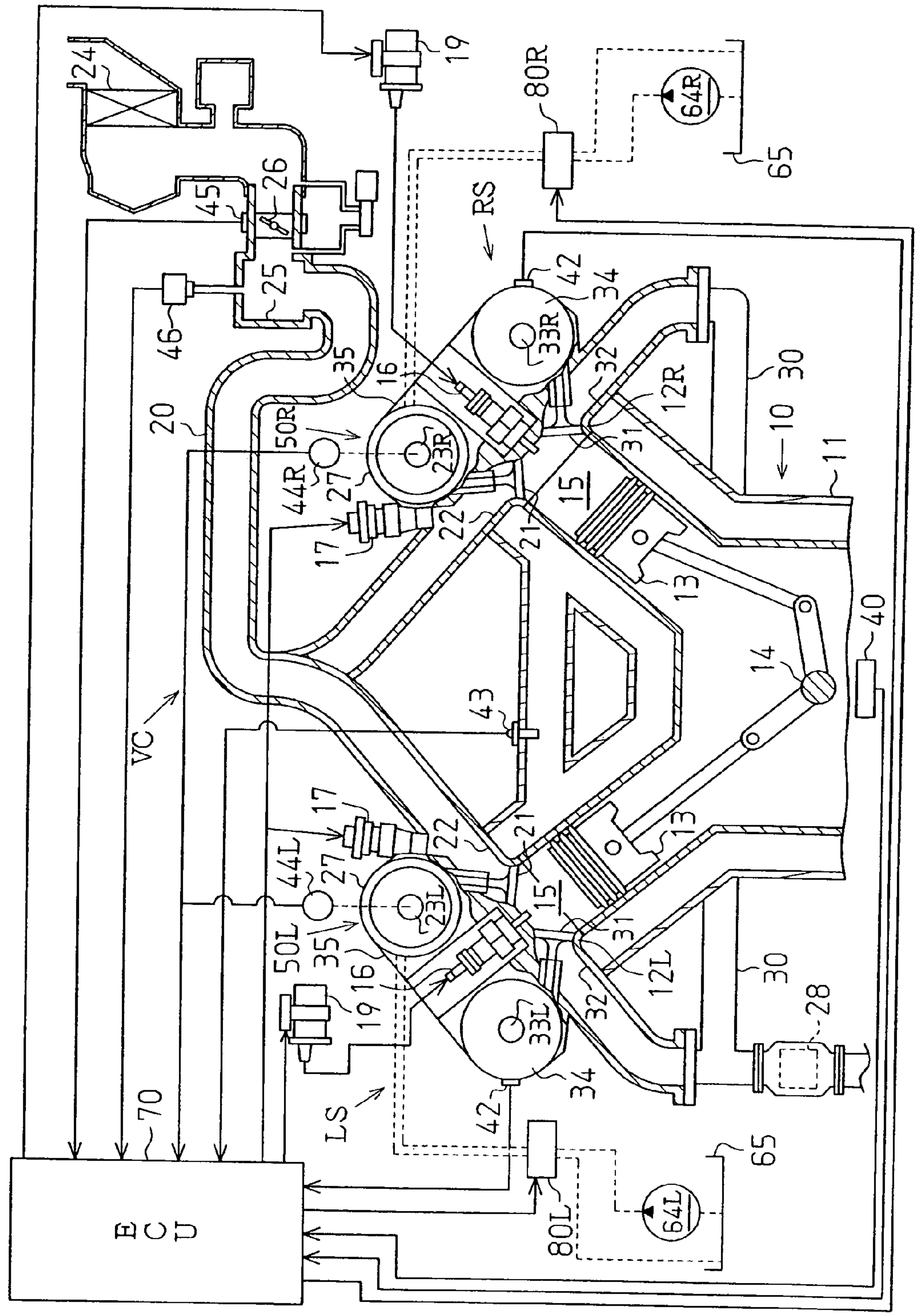
FIG. 1 schematically shows a gasoline engine system including a controller according to a preferred embodiment of the present invention.

A controller according to a preferred embodiment of the present invention is described hereinafter with reference to FIGS. 1 through 9. FIG. 1 schematically shows a vehicle gasoline engine system using the controller of the preferred embodiment.

An internal combustion V-type six-cylinder engine 10 is provided with a cylinder block 11 including a plurality of cylinders arranged in a V-shape with a predetermined angular spacing, and a right cylinder head 12R and a left cylinder head 12L connected to the top of the cylinder block 11. Accordingly, the engine 10 includes a left cylinder group LS and a right cylinder group RS.

The engine 10 is provided with pistons 13, each reciprocating in one of the cylinders provided in the cylinder block 11. A crankshaft 14 is coupled to the bottom end of each piston 13. The crankshaft 14 is rotated by the reciprocation of each piston 13.

A crank angle sensor 40 is disposed near the crankshaft 14, and the crank angle sensor 40 generates a cyclic pulse-type crank angle signal corresponding to the rotation speed of the crankshaft 14. As described later, an electronic control unit (ECU) 70 calculates the rotation speed (engine speed) of the crankshaft 14 by counting the number of crank angle signals generated by the crank angle sensor 40 after a reference position signal has been generated by a cylinder distinguishing sensor 42.

The internal walls of the cylinder block 11 and cylinder heads 12L and 12R and the top of the pistons 13 form a combustion chamber 15 for the combustion of an air-fuel mixture. Spark plugs 16, for igniting the mixture, are installed in the top of the cylinder heads 12L and 12R so as to extend into the combustion chamber 15. Each spark plug 16 is connected to an igniter 19 through an ignition coil (not shown) and is supplied with a high voltage synchronously with the crank angle based on an ignition signal from the ECU 70.

Near the exhaust camshafts 33L and 33R of the cylinder heads 12L and 12R are respectively arranged cylinder distinguishing sensors 42, which generate reference position signals at predetermined rates in conjunction with the rotation of the exhaust camshafts 33L and 33R. The reference position signals are used to distinguish the cylinders and to detect the reference position of the crankshaft 14.

A coolant temperature sensor 43, for detecting the temperature of the coolant flowing through the coolant flow path, is mounted on the cylinder block 11. The ECU 70 uses the coolant temperature te as the engine temperature. Each of the cylinder heads 12L and 12R have intake ports 22 and exhaust ports 32. The intake ports 22 are connected to an intake passage 20, and the exhaust ports 32 are connected to an exhaust passage 30. An intake valve 21 is arranged at each intake port 22, and an exhaust valve 31 is arranged at each exhaust port 32 of the cylinder heads 12.

A left intake camshaft 23L for driving the intake valves 21 is arranged above each intake valve 21 of the left cylinder group LS. A right intake camshaft 23R for driving the intake valves 21 is arranged above each intake valve 21 of the right cylinder group RS. A left exhaust camshaft 33L for driving the exhaust valves 31 is arranged above each exhaust valve 31 of the left cylinder group LS. A right exhaust camshaft 33R for driving the exhaust valves 31 is arranged above each exhaust valve 31 of the right cylinder group RS.

Intake timing pulleys 27 are affixed on one end of both intake camshafts 23L and 23R, and exhaust timing pulleys 34 are affixed on one end of both exhaust camshafts 33L and 33R. The timing pulleys 27 and 34 are connected to the crankshaft 14 so as to rotate synchronously by means of a timing belt 35.

Accordingly, during the operation of the engine 10, a rotational drive force is transmitted from the crankshaft 14 to the camshafts 23L, 23R, 33L, and 33R through the timing belt 35 and the timing pulleys 27 and 34. Each intake valve 21 and each exhaust valve 31 are opened and closed by means of the rotation of the camshafts 23L, 23R, 33L, and 33R by the rotational drive force. The valves 21 and 31 are driven by a predetermined operation timing which is synchronized with the reciprocation of the pistons 13 and the rotation of the crankshaft 14, that is, synchronized with the series of four strokes in the engine 10 which include an intake stroke, a compression stroke, a combustion/expansion stroke, and an exhaust stroke.

Cam angle sensors 44L and 44R are respectively arranged near the intake camshafts 23L and 23R. The cam angle sensors 44L and 44R include electromagnetic pick-ups (not shown) and magnetic rotors (not shown) connected to the intake camshafts 23L and 23R. Furthermore, teeth are formed at equal intervals along the periphery of the magnetic rotor. The cam angle sensors 44L and 44R generate pulse-like cam angle signals in conjunction with the rotation of the intake camshafts 23.

An air cleaner 24 is connected to the air-intake inlet of the intake passage 20, and also disposed in the intake passage 20 is a throttle valve 26 which is driven in linkage with an accelerator pedal (not shown in the drawing). The amount of air introduced into the engine 10 is restricted by the opening and closing of the throttle valve 26.

A throttle sensor 45, for detecting the degree of throttle opening ta, is disposed near the throttle valve 26. Furthermore, a surge tank 25, for suppressing air intake pulsations, is arranged on the downstream side of the throttle valve 26. The surge tank 25 is provided with an intake pressure sensor 46 for detecting the intake pressure within the surge tank 25. An injector 17 for supplying fuel to the combustion chamber 15 is provided near the intake port 22 of each cylinder. The injectors 17 are electromagnetic valves which are opened by an electrical current. Fuel is supplied from a fuel pump (not shown in the drawing) to each injector 17.

Accordingly, during the operation of the engine 10, air filtered by the air cleaner 24 is introduced into the intake passage 20. Each injector 17 injects fuel toward each intake port 22 at the same time air is introduced. As a result, an air-fuel mixture is produced at each intake port 22, and this mixture is introduced into the combustion chamber 15 by means of the open intake valve 21 during the intake process. Then, the mixture in the combustion chamber is burned, and an exhaust gas is generated. The exhaust gas is discharged into the atmosphere through a catalytic converter 28 disposed in the exhaust passage 30.

In the engine 10 of the preferred embodiment, variable valve timing mechanisms (hereinafter referred to as "VVT") 50L and 50R, which vary the valve timing of the intake valves 21 to change the amount of valve overlap. The VVT 50L and VVT 50R are respectively provided on the intake timing pulleys 27 of the left cylinder group LS and right cylinder group RS and are driven by hydraulic force. The VVT 50L and VVT 50R continuously change the valve timing of the intake valve 21 by changing the actual relative rotational phase of the intake camshafts 23L and 23R relative to each intake timing pulley 27. Respectively connected to the VVT 50L and VVT 50R are oil control valves (hereinafter referred to as "OCV") 80L and 80R, and oil pumps 64L and 64R.

In the preferred embodiment, the intake timing pulleys 27 is a rotor that rotates synchronously with the crankshaft 14.

Figure 2:
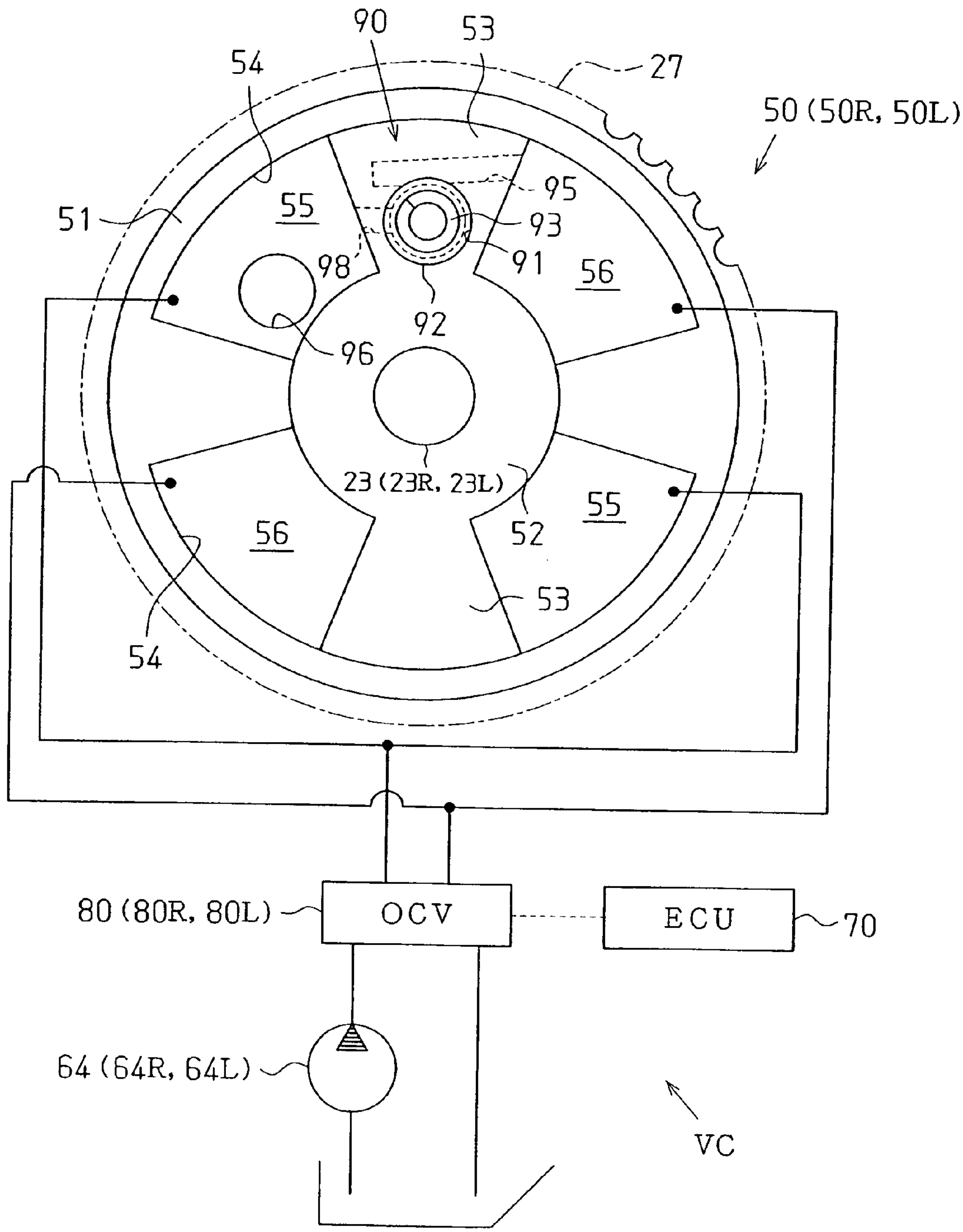
FIG. 2 schematically shows the controller of FIG. 1.

The system structure of the VVT 50L and 50R is described below with reference to FIGS. 2 and 3. For the sake of simplicity, FIG. 2 does not distinguish between the VVT 50L in the left cylinder group LS and the VVT 50R in the right cylinder group RS. FIG. 2 schematically shows the valve operating characteristics controller and the VVT 50 for the intake camshaft 23.

The controller of the VVTs 50 is provided with the ECU 70. The ECU 70 restricts the intake valves 21 to a target valve timing (VVT control) by controlling the OCV 80 based on input signals from various sensors.

The VVT 50 shown in FIG. 2 has a generally circular housing 51, and a vane hub 52 accommodated within the housing 51. The housing 51 is connected to and rotates integrally with the intake timing pulley 27. The vane hub 52 is connected to and rotates integrally with the intake camshaft 23. In the preferred embodiment, the intake camshaft 23 rotates in the clockwise direction as viewed in FIG. 2.

A plurality of vanes 53 extending in the radial direction are formed on the circumference of the vane hub 52. A plurality of concavities 54 extending in the circumference direction are formed on the interior circumference of the housing 51 such that the vanes 53 are respectively disposed within the plurality of concavities 54. An advance pressure chamber 55 and a delay pressure chamber 56 are defined by the vanes 53 in the each concavity 54. Although two vanes 53 and two concavities 54 are shown in FIG. 2, the number of vanes and concavities may be modified as required.

The advance pressure chamber 55 and the delay pressure chamber 56 are each connected to the OCV 80 through a corresponding oil flow path. Operating oil is supplied from the oil pump 64, which is connected to the crankshaft 14, to the OCV 80. The OCV 80 restricts the amount of operating oil supplied to the advance pressure chamber 55 or the delay pressure chamber 56 according to the duty ratio dvt of the voltage supplied to the OCV 80. Specifically, the OCV 80 operates based on command signals from the ECU 70 to supply operating oil to the advance pressure chamber 55 and the delay pressure chamber 56, or discharge operating oil from the advance pressure chamber 55 and the delay pressure chamber 56. As a result, the vane hub 52 rotates relative to the housing 51 according to the difference in the hydraulic pressure of the advance pressure chamber 55 and the hydraulic pressure of the delay pressure chamber 56. The actual relative rotational phase of the intake camshaft 23 therefore changes relative to the intake timing pulley 27, thereby changing the valve timing of the intake valve 21. The OCV 80 of the preferred embodiment functions as an actuator for adjusting the pressure difference (hydraulic pressure difference) between the two pressure chambers 55 and 56.

The valve timing control in the VVT 50 is specifically performed as described below.

The ECU 70 receives signals representing engine operating conditions, such as signals relating to coolant temperature information from the coolant temperature sensor 43, crank angle signals from the crank angle sensor 40, reference position signals from the cylinder distinguishing sensor 42, cam angle signals from the cam angle sensors 44L and 44R, and signals relating to the throttle opening ta from the throttle sensor 45. The ECU 70 calculates the target relative rotational phase (hereinafter referred to as "target phase") vtt of the vane hub 52 to achieve a valve timing suitable for the engine operating conditions based on parameters included in these signals. The ECU 70 determines the actual relative rotational phase (hereinafter referred to simply as "actual phase") vt of the vane hub 52 based on the crank angle signals and cam angle signals.

When the actual phase vt differs from the target phase vtt, the ECU 70 controls the OCV 80 by setting the duty ratio dvt so as to discharge operating oil from one of the advance pressure chamber 55 and the delay pressure chamber 56 and supply operating oil to the other one of the advance pressure chamber 55 and the delay pressure chamber 56. As a result, the vane hub 52 is rotated relative to the housing 51 in accordance with the pressure difference between the advance pressure chamber 55 and the delay pressure chamber 56 such that the actual phase vt approaches the target phase vtt. The duty ratio dvt corresponds to the command value output from the ECU 70.

When the target phase vtt and actual phase vt match as a result of this adjustment, the ECU 70 sets the duty ratio dvt to a holding duty ratio K (for example, approximately 50%) to stop the supply and discharge of operating oil to and from the advance pressure chamber 55 and delay pressure chamber 56. As a result, the actual phase vt of the vane hub 52 is maintained by uniformly maintaining the pressures of the advance pressure chamber 55 and the delay pressure chamber 56.

In the control of the OCV 80, the ECU 70 sets the duty ratio dvt in accordance with the difference between the target phase vtt and the actual phase vt. That is, the greater the difference between the target phase vtt and the actual phase vt, the ECU 70 sets the duty ratio dvt farther from the holding duty ratio K. The variable range of the duty ratio dvt is 0% to 100%. The minimum duty ratio (e.g., 0%), which is one of the two boundary values of the variable range, is the delay side limit value, and the maximum duty ratio (e.g., 100%), which is the other one of the two boundary values of the variable range, is the advance side limit value.

Furthermore, when the target phase vtt is on the advance side of the actual phase vt, the ECU 70 sets the duty ratio dvt at a value between the holding duty ratio K and 100%. In this case, the farther the duty ratio dvt is from the holding duty ratio K, the greater the pressure of the advance pressure chamber 55 becomes relative to the pressure of the delay pressure chamber 56. Conversely, when the target phase vtt is on the delay side of the actual phase vt, the ECU 70 sets the duty ratio dvt at a value between the holding duty ratio K and 0%. In this case, the farther the duty ratio dvt is from the holding duty ratio K, the greater the pressure of the delay pressure chamber 56 becomes relative to the pressure of the advance pressure chamber 55. That is, the greater the difference between the target phase vtt and the actual phase vt, the greater the pressure difference between the two pressure chambers 55 and 56. As a result, the actual phase vt rapidly converges on the target phase vtt.

The vane hub 52 in the VVT 50 is capable of relative rotation within a range from a phase in which the vane 53 is in contact with one wall of the concavity 54 to a phase in which the vane 53 is in contact with the opposite wall of the concavity 54. The phase range of this relative rotation is equivalent to the control range of the actual phase vt in the valve timing control of the preferred embodiment. Below, the farthest position to which the vane hub 52 relatively rotates in the delaying direction (the direction opposite to the rotation direction of the intake camshaft 23) is referred to as the "most delayed position." The most delayed position is set as the initial position of the vane hub 52 when the OCV 80 is not controlled by the ECU 70, that is, the position when the engine is stopped. The farthest position to which the vane hub 52 relatively rotates in the advancing direction (the rotation direction of the intake camshaft 23) is referred to as the "most advanced position." In the VVT 50 of the preferred embodiment, the vane hub 52 relatively rotates in a range from the most delayed position to the most advanced position by the pressure control of the advance pressure chamber 55 and the delay pressure chamber 56.

The VVT 50 is provided with a lock mechanism 90 for controlling (locking) the relative rotation of the vane hub 52 during pressure drops, such as when starting the engine. As shown in FIG. 2, a stepped receiving hole 91, which extends parallel to the axial direction of the intake camshaft 23, is formed in one of the plurality of vanes 52. A lock pin 92 is arranged so as to reciprocate in the receiving hole 91.

Figure 3:
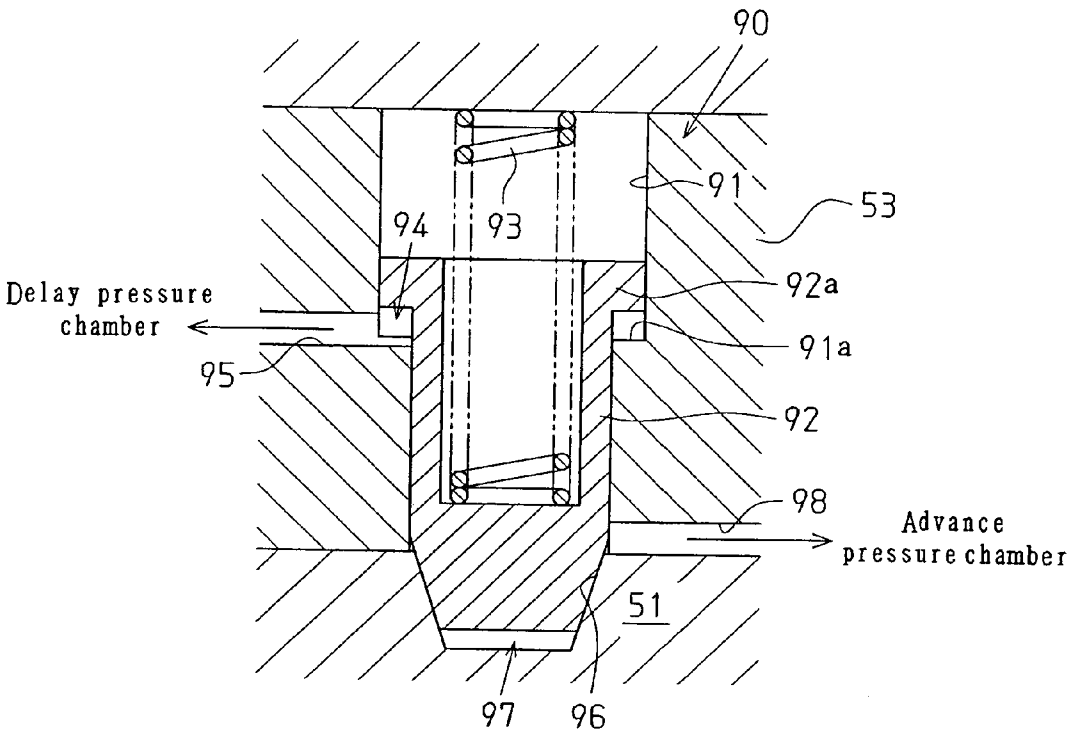
FIG. 3 is a cross sectional view of the lock mechanism included in the controller of FIG. 1.
Figure 4:
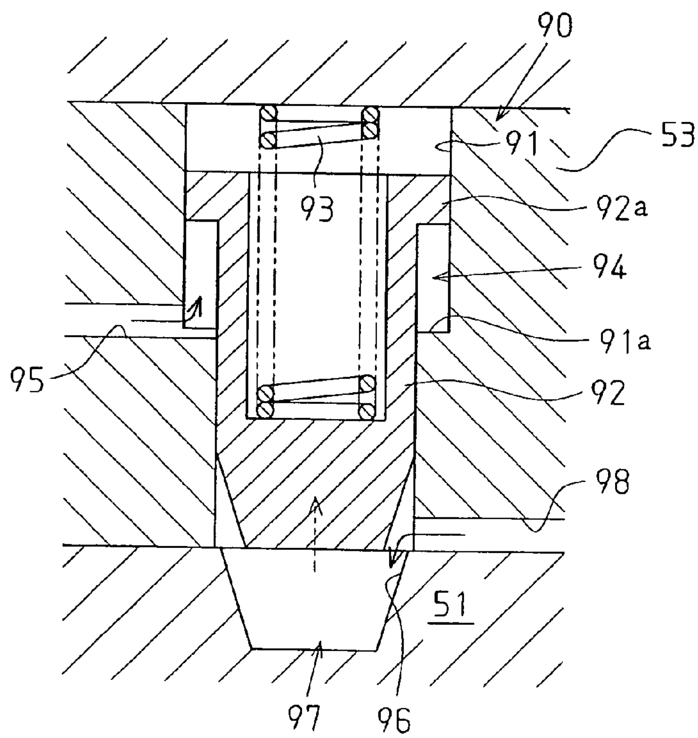
FIG. 4 is a cross sectional view of the lock mechanism of FIG. 3.

The lock pin 92 moves along the axial direction of the intake camshaft 23 between the projected position shown in FIG. 3 and the retracted position shown in FIG. 4 in a state in which the exterior surface of the pin 92 slides on the interior surface of the receiving hole 91. The lock pin 92 is forced toward the housing 51 by a spring 93. A step 92*a* having an enlarged diameter is formed on the base end of the lock pin 92. A ring-like unlock pressure chamber 94 is formed between the step 92*a* and a step 91*a* of the receiving hole 91. A delay oil path 95, which is a communicating passage between the unlock pressure chamber 94 and the delay pressure chamber 56, is formed in the vane 53. The pressure of the delay pressure chamber 56 is transmitted to the unlock pressure chamber 94 through the delay oil path 95. Accordingly, when the pressure of the delay pressure chamber 56 increases, the pressure of the unlock pressure chamber 94 also increases.

The housing 51 includes a lock hole 96. When the vane hub 52 is located at the most delayed position, the lock pin 92 is inserted in, or engaged with, the lock hole 96. As shown in the state of FIG. 3, when the lock pin 92 is inserted in the lock hole 96 by the urging force of the coil spring 93 so that the lock pin 92 engages the lock hole 96, the vane hub 52 is mechanically fixed to the housing 51 so as to restrict (lock) the relative rotation of the vane hub 52. That is, in a state in which relative rotation is restricted (locked state), the actual phase vt is maintained at the most delayed phase (lock phase). In the preferred embodiment, the lock pin 92 and the lock hole 96 respectively define a projection and a recess that are engaged through a convexo-concave relationship to enable relative rotation of the camshaft 23 to be locked.

An unlock pressure chamber 97 is defined between the tip of the lock pin 92 and the wall of the lock hole 96. An advance oil path 98, which is a communicating passage between the unlock pressure chamber 97 and the advance pressure chamber 55, is formed on the sliding surface of the vane 53 and housing 51. The pressure of the advance pressure chamber 55 is transmitted to the unlock pressure chamber 97 through the advance oil path 98. Accordingly, when the pressure of the advance pressure chamber 55 increases, the pressure of the unlock pressure chamber 97 also increases.

The oil operating pressure of the unlock pressure chambers 94 and 97 acts in a direction to disengage the lock pin 92 from the lock hole 96. Accordingly, when the pressure of one or both of the advance pressure chamber 55 and the delay pressure chamber 56 increases, and the pressure of the unlock pressure chambers 94 and 97 increases sufficiently, the lock pin 92 is moved in a direction separating the pin 92 from the lock hole 96, as shown in FIG. 4. Therefore, the lock mechanism 90 unlocks the relative rotation of the vane hub 52. That is, in the lock mechanism 90, dominant elements acting on the lock pin 92 so that it moves away from the lock hole 96 is the hydraulic pressure of each of the unlock pressure chambers 94 and 97. In the preferred embodiment, a state in which the lock mechanism 90 unlocks relative rotation is referred to as an unlocked state.

In the preferred embodiment, the unlock pressure chamber 97, which is connected to the advance pressure chamber 55, has an area, on which the hydraulic pressure acts to release (disengage) the lock pin 92 from the lock hole 96, greater than that of the unlock pressure chamber 94, which is connected to the delay pressure chamber 56. That is, the force acting on the lock pin 92 in a direction separating (disengaging) the lock pin 92 from the lock hole 96 is more affected by the pressure of the advance pressure chamber 55 than the pressure of the delay pressure chamber 56.

In the preferred embodiment, the relative rotation of the vane hub 52 is locked at the most delayed position, that is, the lock phase, when the hydraulic pressure is low immediately after starting the engine 10. Thereafter, the oil pumps 64L and 64R are capable of supplying sufficient oil to the pressure chambers 55 and 56 in accordance with the rise in the engine speed ne. Then, the lock mechanism 90 releases the lock on the relative rotation of the vane hub 52, and the VVT 50 changes the actual phase vt of the vane hub 52. The ECU 70 performs control for early unlocking of the relative rotation of the vane hub 52. Results of this control are the suppression of torque fluctuation caused by the difference in the actual phases vt, that is, the difference in the valve timings between both cylinder groups LS and LR in the engine 10, and a rapid realization of a valve timing suitable for the operating conditions of the engine 10.

Details of the process sequence of the control of the VVT 50 performed by the ECU 70 are described below with reference to the flowcharts of FIGS. 5 through 8.

The series of processes shown in these flowcharts are alternately repeated for the left cylinder group LS and the right cylinder group LR in predetermined control cycles executed by the ECU 70.

Figure 5:
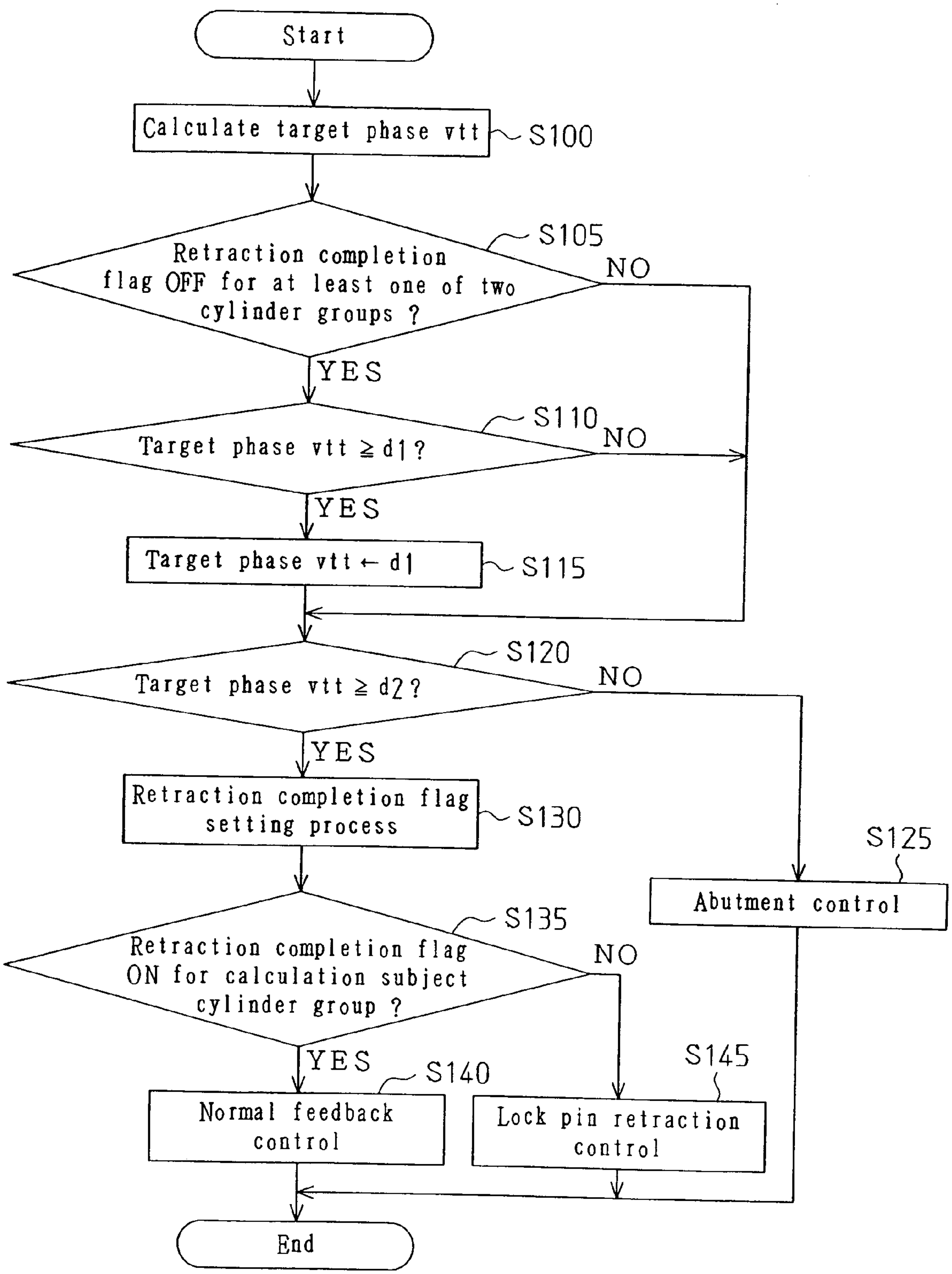
FIG. 5 is a main flowchart showing the processing performed by the ECU incorporated in the controller of FIG. 1

As shown in the flowchart of FIG. 5, the ECU 70 first calculates the target phase vtt in step S100. As previously described, the ECU 70 calculates the target phase vtt based on the previously mentioned parameters so as to realize a valve timing suitable for the operating conditions of the engine 10. In the preferred embodiment, the target phase vtt and the actual phase vt are set using the previously mentioned lock phase as a reference (zero). The target phase vtt increases, as the vane hub 52 separates from the lock phase to the advance side.

In step S105, the ECU 70 determines whether or not the retraction completion flag is OFF for at least one of the cylinder groups LS and RS. The "retraction completion flag" indicates whether or not the lock pin 92 has been disengaged (completely retracted) from the lock hole 96, that is, whether or not the lock mechanism 90 is in the unlocked state. Specifically, the retraction completion flag is set to OFF in the locked state in which the lock pin 92 is inserted into the lock hole 96, and set to ON in the unlocked state in which the lock pin 92 is disengaged from the lock hole 96. In the initial state, the retraction completion flag is set to OFF beforehand for both cylinder groups LS and RS.

When the determination result is YES in step S105, that is, when it is determined that at least one lock mechanism 90 of the two cylinder groups LS and RS is in a locked state, the process proceeds to step S110. Conversely, when the determination result is NO in step S105, that is, when it is determined that the lock mechanisms 90 of both cylinder groups LS and RS are in the unlocked state, the process proceeds to step S120.

In step S110, the ECU 70 determines whether or not the target phase vtt calculated in step S100 is greater than a predetermined phase d1. The predetermined phase d1 is set to a value greater than zero, that is, to a phase on the advance side of the lock phase.

When the determination result is YES in step S110, that is, when the target phase vtt is greater than the predetermined phase d1, the ECU 70 sets the target phase vtt to the predetermined phase d1 in step S115. That is, when the target phase vtt calculated in step S100 is greater than the predetermined phase d1, the target phase vtt is replaced by the predetermined value d1. When the target phase vtt is equal to the predetermined value d1, the target phase is maintained without any changes. When the determination result is NO in step S110, that is, when the target phase vtt calculated in step S100 is less than the predetermined phase d1, the target phase vtt value is not replaced, and the process proceeds to step S120. The target phase vtt is restricted within a range below the predetermined phase d1 by means of these processes.

When the OCV 80 is actuated so as to have the actual phase vt of the vane hub 52 approach the restricted target phase vtt, the actual phase vt is restricted to less than the predetermined phase d1. For example, one of the two VVTs 50 may be in the locked state, and the other VVT 50 may be in an unlocked state. In this case, the difference between the actual phases vt between the two VVTs 50, that is, between the two cylinder groups LS and RS, is restricted to less than the predetermined phase d1 even when the unlocked vane hub 52 is relatively rotated by the actuation of the OCV 80. The predetermined phase d1 is set to a value capable of sufficiently restricting the torque fluctuation of the engine 10 which is caused by the difference between the actual phases vt, that is, the difference between the valve timings.

In step S120, the ECU 70 determines whether or not the target phase vtt is greater than or equal to the predetermined phase d2. The predetermined phase d2 is set such that the following relationship is satisfied: 0<d2<d1. When the determination result is NO in step S120, that is, when the target phase vtt is less than the predetermined phase d2, the ECU 70 executes abutment control in step S125. In the abutment control, the ECU 70 performs hydraulic pressure control for inducing relative rotation of the vane hub 52 toward the most delayed position to ensure the setting of the actual phase vt to zero.

Specifically, the ECU 70 sets the duty ratio dvt of the voltage applied to the OCV 80 to "K−X" that ensures relative rotation of the vane hub 52 to the most delayed position. Here, K is the previously mentioned holding duty ratio, and X is a predetermined duty ratio (for example, 20%) set so as to ensure relative rotation of the vane hub 52 to the most delayed position. Accordingly, in the preferred embodiment, when the target phase vtt is less than the predetermined phase d2 at the process of step S120, the vane hub 52 relatively rotates toward the most delayed position and does not relatively rotate toward the target phase vtt.

When the determination result is YES in step S120, the ECU 70 executes the retraction completion flag setting process in step S130. In the retraction completion flag setting process, the ECU 70 sets the ON/OFF state of the flag subject to determination in step S105 based on the operating conditions of the engine 10.

Figures 6, 7:
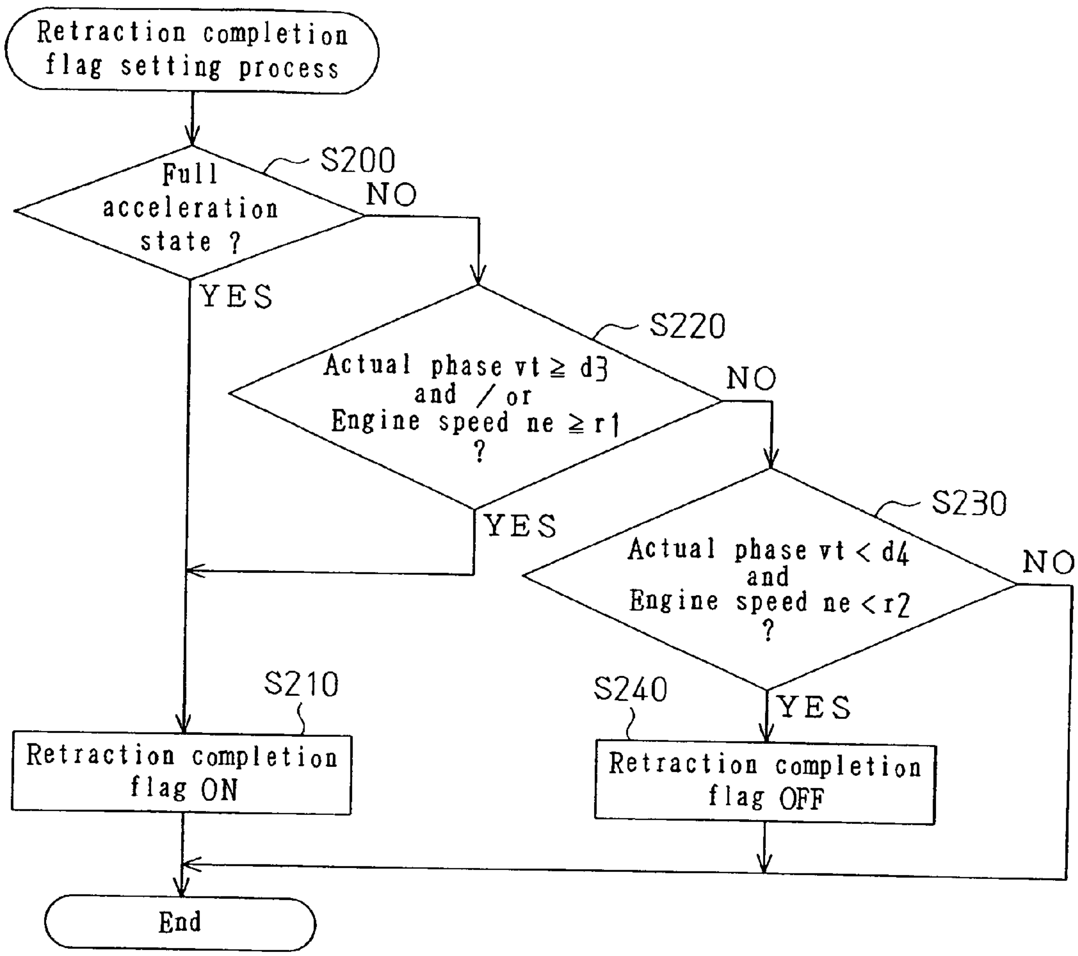
FIG. 6 is a flowchart showing the processing in the retraction-complete flag setting process of the preferred embodiment.
FIG. 7 is a map showing the relationship between coolant temperature and a predetermined speed in the preferred embodiment.

Specifically, in the retraction completion flag setting process shown in the flowchart of FIG. 6, the ECU 70 first determines whether or not the engine 10 is in the full acceleration state in step S200. For example, the ECU 70 determines the full acceleration state based on whether or not the throttle opening ta detected by the throttle sensor exceeds a predetermined angle (for example, 30 degrees). The ECU 70 determines the presence of the full acceleration state if the throttle opening ta exceeds a predetermined angle, and determines the presence of a non-full acceleration state when the predetermined angle is not exceeded.

When the determination result is YES in step S200, that is, when the engine 10 is in the full acceleration state, the engine speed ne is considered to rise rapidly. Accordingly, the discharge pressure of the oil pump 64, which rises quickly in conjunction with the rapid rise in the engine speed ne, is regarded as a sufficient value for disengaging the lock pin 92 from the lock hole 96, and the ECU 70 sets the retraction completion flag to ON in step S210. When the determination result is NO in step S200, the process moves to step S220.

In step S220, the ECU 70 determines whether or not at least one condition is established among the condition of the actual phase vt exceeding the predetermined phase d3, and the condition of the engine speed ne exceeding a predetermined speed r1. The predetermined phase d3 is set so as to satisfy the relationship "0<d3<d1." If the actual phase vt is greater than or equal to the predetermined phase d3, it is considered that the vane hub 52 is completely removed from the lock position (most delayed position) and the lock mechanism 90 is in the unlocked state. The predetermined speed r1 is the value of the engine speed in a hypothetical state in which the discharge pressure of the oil pump 64 driven by the engine 10 is more than sufficiently high so as to set the lock mechanism 90 in the unlocked state. That is, when the determination result is YES in step S220, the ECU 70 sets the retraction completion flag to ON in step S210.

When the determination result is NO in step S220, the ECU 70 determines whether or not the actual phase vt is less than a predetermined phase d4 and the engine speed ne is less than a predetermined speed r2. The predetermined phase d4 is set so as to satisfy the relationship of "0<d4<d3." When the actual phase vt is less than the predetermined phase d4, there is a high possibility that the vane hub 52 is at or near the lock position, and the lock mechanism 90 is set to the locked state. The predetermined speed r2 is set so as to satisfy the relationship "0<r2<r1." The predetermined speed r2 is the engine speed hypothesized when the discharge pressure of the oil pump 64 is insufficient to set the lock mechanism 90 to the unlocked state.

When the determination result is YES in step S230, the ECU 70 regards the lock mechanism 90 as set to the locked state by the current actual phase vt and engine speed ne. Accordingly, the ECU 70 sets the retraction completion flag to OFF in step S240. When the determination result is NO in step S230, the ECU 70 does not perform the retraction completion flag setting process in steps S210 and S240, and the process of the flowchart in FIG. 6 ends. In the retraction completion flag setting process of the preferred embodiment, a numerical difference may exist between the determination reference values of step S220 (predetermined phase d3 and predetermined speed r1), and the determination reference values of step S230 (predetermined phase d4 and speed r2). Between steps S220 and S230 exists a relationship of hysteresis relating to the aforesaid numerical difference.

In the preferred embodiment, the ECU 70 sets the predetermined speed r1 in accordance with the coolant temperature te detected by the coolant temperature sensor 43. For example, the ECU 70 sets the predetermined speed r1 based on a map M101 such as that shown in FIG. 7. The map M101 represents the relationship between the coolant temperature te and the predetermined speed ne, and is stored beforehand in the ECU 70. The higher the coolant temperature te, the higher the predetermined speed r1, as shown in map M101. The predetermined speed r2 is set at a value obtained by subtracting the hysteresis component from the predetermined speed r1.

The predetermined speeds r1 and r2 are set according to the coolant temperature because the discharge pressure of the oil pump 64 may differ due to the effects of oil viscosity changing in conjunction with oil temperature even at the same engine speed ne. If the coolant temperature te is high, the oil temperature is assumed to be high and the oil viscosity low due to the influence of the coolant. In this case, the hydraulic pressure of the oil pump 64 is considered to be relatively low. For this reason, the ECU 70 sets the predetermined speeds r1 and r2 according to the temperature te using the coolant temperature te as a parameter for estimating the oil temperature. In this way, the ECU 70 adjusts the predetermined speeds r1 and r2 used as reference values for determinations by the change in the discharge pressure of the oil pump 64 caused by the influence of oil temperature.

In step S135, the ECU 70 determines whether or not the retraction completion flag is ON for cylinder group LS or RS currently subject to processing (calculation subject cylinder group). In the step S130 and S135, the ECU 70 functions as a lock determination means for determining whether the lock mechanism 90 is in the locked state or the unlocked state. When the determination result is YES in step S135, that is, when the lock mechanism 90 of the calculation subject cylinder group is regarded as being in the unlocked state, the process proceeds to step S140, and the ECU 70 executes normal feedback control. In the normal feedback control, the ECU 70 calculates the duty ratio dvt corresponding to the difference between the target phase vtt and the actual phase vt as described previously. Then, the ECU 70 controls the OCV 80 using the calculated duty ratio dvt so as to cause the actual phase vt to approach the target phase vtt.

For example, in step S140, the lock mechanism 90 of the calculation subject cylinder group is in an unlocked state, and the lock mechanism 90 of the other cylinder group is in a locked state. The VVT 50 of the calculation subject cylinder group is controlled such that the actual phase vt approaches the target phase vtt which is less than or equal to the predetermined phase d1. The vane hub 52 of the VVT 50 in the locked state is at the lock position. Accordingly, the difference in the actual phases vt between the two cylinder groups LS and RS is limited to less than or equal to the predetermined phase d1. As a result, torque fluctuation of the engine 10 caused by the actual phase vt difference, that is, the difference in valve timings, is limited.

When the lock pin 92 is disengaged from the lock hole 96 in the condition in which there is a pressure difference between the two pressure chambers 55 and 56, the relative rotation force of the vane hub 52 produced by the pressure difference between the pressure chambers 55 and 56 pushes the lock pin 92 toward the lock hole 96. Accordingly, there is a friction force (resistance force) acting on the lock pin 92 in a direction opposite the disengaging direction to hinder the disengagement of the lock pin 92 from the lock hole 96 and the receiving hole 91. The friction force increases as the pressure difference between the pressure chambers 55 and 56 increases, that is, as the relative rotation force of the vane hub 52 increases. The friction force increases as the duty ratio dvt deviates from the holding duty ratio K. Further, the friction force is a resistance force countering the disengagement of the lock pin 92, which hinders the transition from the locked state to the unlocked state, and is a source of unlock failure.

In recent years the actual engine speed range of the engine 10 has become lower, and it has thus become difficult to ensure the discharge pressure of the oil pump 64. Accordingly, the force for moving the lock pin 92 in the disengaging direction is insufficient, and unlock dysfunction readily occurs. Furthermore, there is a tendency to design the VVT 50 with increased volume and reduce the friction resistance between the intake valve 21 and intake camshaft 23 so as to improve the response of the VVT 50. The improved response obtained in this way tends to increase the resistance force before disengagement of the lock pin 92 is completed. This leads to unlock failure.

Accordingly, in order to readily and smoothly shift the lock mechanism 90 to the unlocked state, it is desirable to eliminate the pressure difference between the two pressure chambers 55 and 56 by having the OCV 80 control the hydraulic pressure. In other words, it is desirable to realize a condition in which the relative rotation force by the hydraulic pressure does not act on the vane hub 52. In this condition, the previously mentioned resistance is absent, and the lock pin 92 is smoothly disengaged from the lock hole 96. To realize the absence of this relative rotation force, the duty ratio dvt is set to the holding duty ratio K.

However, the force acting on the lock pin 92 in a direction separating from the lock hole 96 is more affected by the hydraulic pressure of the advance pressure chamber 55 than that of the delay pressure chamber 56. Accordingly, as the duty ratio dvt becomes higher, or becomes closer to 100%, the force acting in the disengagement direction increases.

In the preferred embodiment, when the pressure of the advance pressure chamber 55 is slightly higher than that of the delay pressure chamber 56, a hydraulic pressure state in which a value obtained by subtracting the resistance force from the force acting in the disengagement direction is maximum, or a "most easily unlocking hydraulic pressure state" of the lock mechanism 90, is obtained. Hereinafter, the duty ratio (command value) for achieving the "most easily unlocking hydraulic pressure state" is referred to as an unlocking duty ratio R. The unlocking duty ratio R is greater than the holding duty ratio K by a predetermined value r and may be expressed by "K+r." The predetermined value r is set to a minute value (e.g., 5%) that satisfies the relationship of "$0<r<X$." The unlock duty ratio R corresponds to an unlock command value that achieves a "most easily unlocking fluid pressure state (hydraulic pressure state)."

To achieve the "most easily unlocking hydraulic pressure state," the duty ratio dvt is set to the unlocking duty ratio R when controlling the OCV 80. However, due to, for example, dispersions of the oil temperature and the engine speed ne that affect the viscosity of the operating oil, the optimal duty ratio for achieving the "most easily unlocking hydraulic pressure state" (hereinafter referred to as actual optimal duty ratio DF) may actually change and differ from the unlocking duty ratio R. In this case, even if the ECU 70 sets the duty ratio dvt to the unlock duty ratio R, the hydraulic pressure state varies in accordance with the dispersion, and the "most easily unlocking pressure state" is not achieved.

Accordingly, in the preferred embodiment, when the determination result is NO in step S135, that is, when the lock mechanism 90 of the calculation subject cylinder group is presumed to be in a locked state, the ECU 70 performs lock pin retraction control in step S145. In the lock pin retraction control, the ECU 70 controls the hydraulic pressure supplied to the VVT 50 to shift the lock mechanism 90 from the locked state to the unlocked state as soon as possible. More specifically, the ECU 70 readily shifts the lock mechanism 90 to the unlocked state by increasing the duty ratio dvt in the predetermined range from the lower limit value (first predetermined value) to the unlocking duty ratio R and then to the upper limit value (second predetermined value). The "predetermined range (hereinafter referred to as gradation range)" is included in the variable range of the duty ratio dvt when controlling the OCV 80. The gradation range includes the holding duty ratio K and the unlocking duty ratio R. The lower limit of the gradation range is set to be greater than the minimum duty ratio in the variable range of the duty ratio dvt (lower limit value of variable range) and smaller than the holding duty ratio K. The upper limit value of the gradation range is set to be greater than the unlocking duty ratio R and smaller than the maximum duty ratio in the variable range (upper limit value of variable range).

Figure 8:
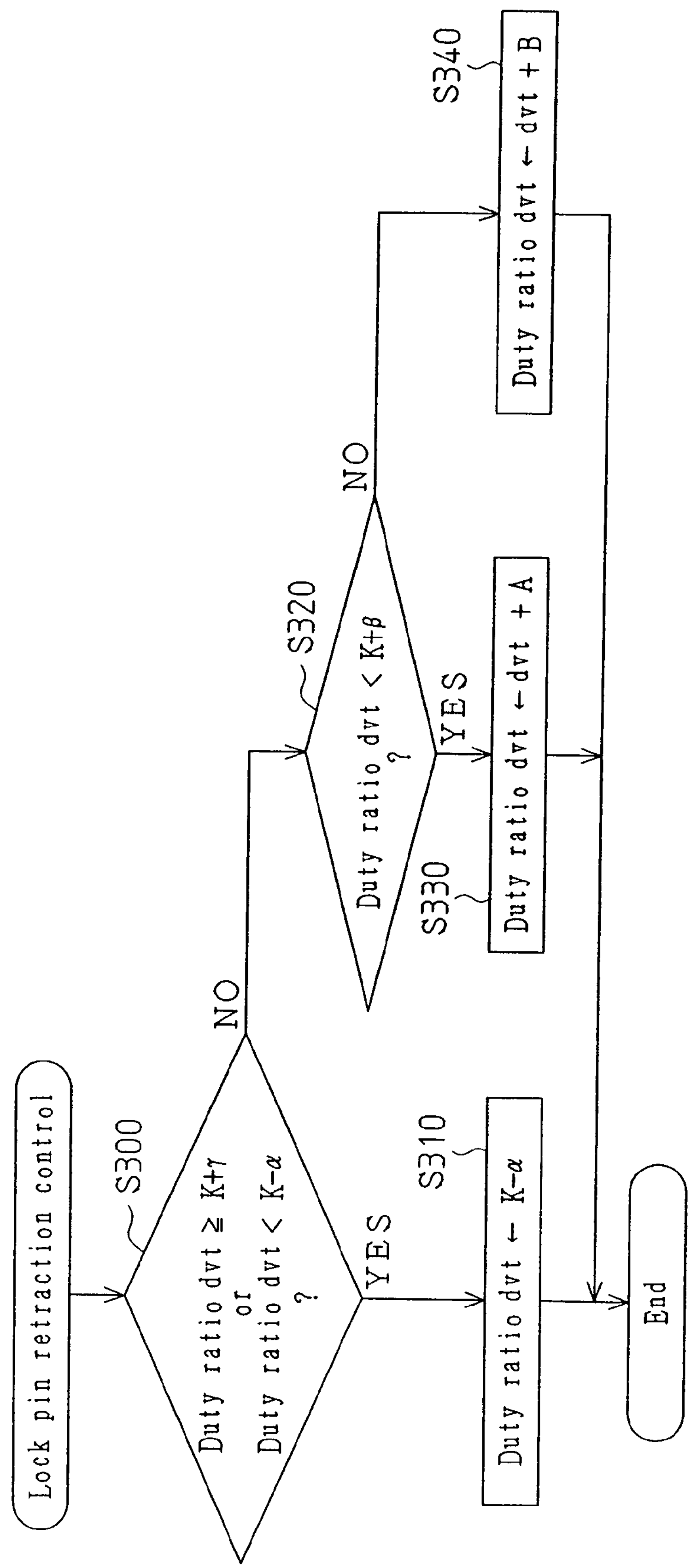
FIG. 8 is a flowchart showing the processing in the lock pin retraction control process of the preferred embodiment.

In the lock pin retraction control as shown in the flowchart of FIG. 8, first, in step S300, the ECU 70 determines whether or not the currently set duty ratio dvt is greater than or equal to "K+γ", or is less than "K−α". The value K is the previously mentioned holding duty ratio. Further, α is set at a predetermined value (e.g., 5%) so as to satisfy the relationship "$0<\alpha<X$" and "$(DLmax)<(r+\alpha)$". The actual optimal duty ratio DF may disperse to the delay side from the unlocking duty ratio R. "DLmax" is set to the presumed maximum value of the dispersion. Further, "r+α" is a value obtained by subtracting value "K−α" from the unlocking duty ratio R (K+r), and "K−α" corresponds to the lower limit value of the gradation range. In other words, the gradation range is set so that the actual optimal duty ratio DF does not exceed the lower limit value of the gradation range even if the dispersion of the actual optimal duty ratio DF toward the delay side becomes maximum.

Furthermore, γ is set so as to satisfy the relationship of "α<γ," "r<γ," and "(DEmax)<(γ−r)." The actual optimal duty ratio DF may disperse to the advance side from the unlocking duty ratio. "DEmax" is set at the presumed maximum value of the dispersion. Further, "γ−r" is a value obtained by subtracting the unlocking duty ratio R (K+r) from the value "K+γ," and "K+γ" corresponds to the upper limit value of the gradation range. That is, the gradation range is set so that the actual optimal duty range DF does not exceed the upper limit value of the gradation range even if the dispersion of the actual optimal duty ratio DF toward the advance side is maximum.

When the determination result is YES in step S300, the ECU 70 regards the duty ratio dvt as outside the gradation range, and the value of the duty ratio dvt is replaced by the lower limit value "K−α" in step S310. Then, the ECU 70 actuates the OCV 80 using the duty ratio dvt.

After the process in the flowchart of FIG. 5 starts, the ECU 70 may execute the determination process in step S300 without executing the process for setting the duty ratio dvt in step S125 or step S140. In this case, the ECU 70 determines the duty ratio dvt previously set as the initial value, for example, a predetermined duty ratio dvt less than "K−α." In this instance, the ECU 70 sets the duty ratio to "K−α" in step S310.

Alternatively, when the determination result is NO in step S300, the ECU 70 determines whether or not the duty ratio dvt determined in step S300 is less than "K+β" in step S320. Here, β is set to a predetermined value satisfying the relationship "β<γ." In the preferred embodiment, it has been confirmed through experiments that there is a high possibility of the actual optimal duty ratio DF existing between "K−α" and "K+β" (not including the value "K+β") in the gradation range. That is, in step S320, the ECU 70 determines whether or not there is a high possibility of the subject duty ratio dvt shifting to the unlocked state in the gradation range.

When the determination result is YES in step S320, that is, when there is a high possibility that the lock mechanism 90 can shift to the unlocked state, the process proceeds to step S330. Conversely, when the determination result is NO in step S320, that is, when there is a low possibility that the lock mechanism 90 can shift to the unlocked state, the process proceeds to step S340.

In step S330, the ECU 70 adds a predetermined update amount A to the current duty ratio dvt. Then, the ECU 70 actuates the OCV 80 using the added duty ratio dvt. In step S340, the ECU 70 adds a predetermined update amount B to the current duty ratio dvt. Then, the ECU 70 actuates the OCV 80 using the added duty ratio dvt.

Accordingly, the duty ratio dvt is gradually increased when the ECU 70 repeatedly executes the processes of steps S330 and S340. In this case, the predetermined update amount A and B are set so as to satisfy the relationship "0<A<B." For example, when the process of step S330 is repeated, the duty ratio dvt increases more moderately than when the process of step S340 is repeated. In this way the duty ratio dvt increase more slowly in the range in which there is a high possibility of the lock mechanism 90 shifting to the unlocked state in the gradation range compared to a range of low possibility.

In step 145 (i.e., steps S300 to S340), the ECU 70 functions as a command value setting means for increasing the command value of the VVT 50 from the first predetermined value to the unlocking command value and then to the second predetermined value.

Figure 9:
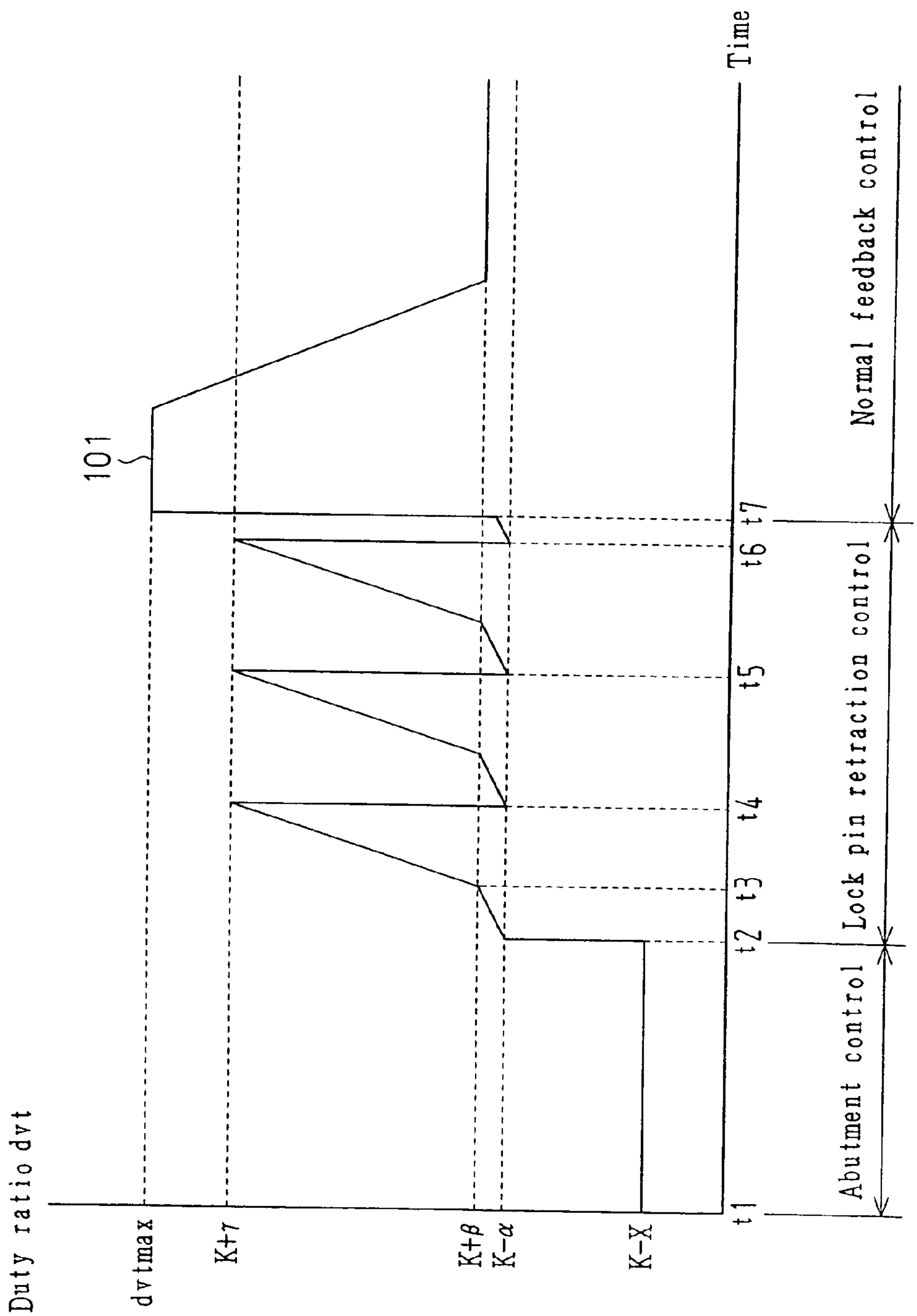
FIG. 9 is a timing chart showing the change in the duty ratio in the preferred embodiment.

In the calculation subject cylinder group, the duty ratio dvt changes, for example, as indicated by line 101 in the timing chart of FIG. 9, by repeating cycles of the series of processes shown in FIGS. 5, 6, and 8.

Referring to FIG. 9, at time t1, the duty ratio dvt is maintained at "K−X" by the abutment control. Thereafter, when the target phase vtt is set above d2 (but the calculation subject cylinder group is locked), the duty ratio dvt is replaced by "K−α" at time t2. Thereafter, the duty ratio dvt moderately and linearly increases. When the duty ratio dvt attains "K+β" at time t3, the duty ratio dvt increases more rapidly than heretofore. Then, when the duty ratio dvt attains "K+γ," the duty ratio dvt is again set to "K−α" at time t4.

While the duty ratio dvt is changing from "K−α" to "K+γ," there is an instance when the duty ratio dvt matches the actual optimal duty ratio DF. This instance, needless to say, is when the hydraulic pressure state of the pressure chambers 55 and 56 is in the "most easily unlocking state."As described previously, there is a high possibility of the actual optimal duty ratio DF existing between "K−α" and "K+β" (not including the value "K+β") in the gradation range. For this reason, the ECU 70 sets a moderate increasing rate for the duty ratio dvt in this range from "K−α" to "K+β" compared to the increasing rate of the duty ratio dvt in the range from "K+β" to "K+γ." That is, the ECU 70 moderately increases the duty ratio dvt in the range in which there is a high possibility of the lock mechanism 90 shifting to the unlocked state. In this way, the ECU 70 slowly increases the pressure difference between the pressure chambers 55 and 56 in conjunction with the increase in the duty ratio dvt, and this slowly increases the resistance countering the disengagement of the lock pin 92. This avoids a state in which the easily unlocking period is too short due to sudden increase in the duty ratio that causes the time for disengagement of the lock pin 92 to be insufficient. In other words, unlocking is further ensured.

In the range from "K+β" to "K+γ" which is considered to have a low possibility of shifting to the unlocked state, the ECU 70 rapidly increases the duty ratio dvt compared to the range from "K−α" to "K+β." In this way, the time required for duty ratio dvt to attain "K+γ" is reduced compared to when the duty ratio dvt is increased moderately in the range "K+β" to "K+γ" same as in the range from "K−α" to "K+β." If the time required for the lock pin retraction control is increased, then the start of the normal feedback control is delayed by the extent of that increase. Then, the obtainment of a valve timing suitable for the engine operating conditions is delayed. This is uncomfortable to the driver. Accordingly, in order to avoid this situation, it is advantageous that the time required for the lock pin retraction control is shortened.

The ECU 70 repeats the duty ratio dvt addition and subtraction control of time t2 to t4 until the retraction completion flag is set to ON for the calculation subject cylinder group (time t4 to t7). When the retraction completion flag changes from OFF to ON (time t7), the ECU 70 proceeds to the normal feedback control. In line 101, the ECU 70 gradually decreases the duty ratio dvt after setting it to dvtmax, which is greater than "K+γ", in accordance with the difference between the target phase vtt and the actual phase vt.

The valve operating characteristics controller of the preferred embodiment has the advantages described below.

(1) When the ECU 70 sets the lock mechanism 90 in the unlocked state and changes the actual phase vt, the ECU 70 increases the duty ratio dvt from the first predetermined value "K−α," which differs from the unlocking duty ratio R, to the unlocking duty ratio R and then to the second predetermined value "K+γ". Thus, even if the actual optimal duty ratio DF most suitable for actually achieving the "most easily unlocking hydraulic pressure state (fluid pressure state)" differs from the unlocking duty ratio R, the graded duty ratio dvt matches the actual optimal duty ratio DF at a certain point of time. In other words, in the preferred embodiment, there is a high possibility of the ECU 70 achieving the "most easily unlocking fluid pressure state" in comparison with when, for example, an ECU grades (gradually increases or decreases) the duty ratio dvt from the unlocking duty ratio R to either one of the first and second predetermined values. For the ECU 70 to achieve the "most easily unlocking fluid pressure state," there is no need to use a map and performs complicated calculations based on the engine speed ne, the fluid viscosity, and etc. In other words, unlocking is readily performed with a simple structure.

(2) The value for starting grading (increase) of the duty ratio dvt, or the lower limit value "K−α" is set within the variable range of the duty ratio when controlling the OCV 80. Accordingly, in comparison to an ECU that increases the duty ratio dvt from the minimum duty ratio of the variable range, the ECU 70 of the preferred embodiment shortens the time from when the duty ratio dvt starts to increase to when the duty ratio dvt reaches the actual optimal duty ratio DF. In other words, unlocking is readily performed.

(3) In part of a range including the unlocking duty ratio R of the gradation range of the duty ratio dvt, the increasing rate of the duty ratio dvt is moderate in comparison to other ranges. In part of the above-described range including the unlocking duty ratio R, the possibility of the actual optimal duty ratio DF existing is greater in comparison to other ranges. That is, in the range in which there is a relatively high possibility of the "most easily unlocking hydraulic pressure state" existing, the change in the hydraulic pressure difference is moderate. Thus, the easily unlocking hydraulic pressure state continues for a relatively long time. This ensures that unlocking is performed.

In a range in which the possibility of achieving the "most easily unlocking hydraulic pressure state" is relatively low, the increasing rate of the duty ratio dvt is rather high. This reduces the time required for grading the duty ratio dvt from the lower limit value "K−α" to the upper limit value "K+γ."

(4) The ECU 70 determines whether the lock mechanism 90 is in the locked state or the unlocked state. When the lock mechanism 90 is in the locked state, the ECU 70 increases the duty ratio dvt from the lower limit value "K−α" to the upper limit value "K+γ." In other words, the ECU 70 does not perform meaningless processing such as increasing the duty ratio dvt even though the lock mechanism 90 is in the unlocked state. This prevents the starting of changing the actual phase vt, or the valve timing, from being delayed.

(5) When the lock mechanism 90 is not determined as being in the unlocked state, the ECU 70 repeatedly grades the duty ratio dvt from the lower limit value "K−α" to the upper limit value "K+γ." This further ensures that unlocking is performed.

(6) The upper limit value "K+γ" is set to a value in the variable range of the duty ratio dvt. Accordingly, in the preferred embodiment, in comparison to when the maximum duty ratio of the variable range is set as the upper limit value of the gradation range, the time from when the duty ratio dvt starts to increase to when the upper limit value is reached is reduced. When the ECU 70 repeatedly grades the duty ratio as in the preferred embodiment, such time reducing effect is significant.

(7) The ECU 70 determines whether the lock mechanism is in the locked state or in the unlocked state based on whether the engine speed ne is greater than or equal to a predetermined value. That is, the ECU 70 performs determination based on the engine speed ne, which has a correlation with the hydraulic pressure acting on the lock mechanism 90. Accordingly, in comparison to when performing the determination based only on the actual phase vt obtained by the crank angle sensor 40 and the cam angle sensor 44, the time required for the determination is reduced. Further, since such determination is performed, for example, a pressure sensor for directly detecting the hydraulic pressure is unnecessary.

(8) In the preferred embodiment, the predetermined value used as a determination reference for determining whether the lock mechanism 90 is in the locked state or the unlocked state (predetermined speeds r1 and r2) is set in accordance with the temperature of the operating oil that affects unlocking.

The hydraulic pressure for shifting the lock mechanism 90 to the unlocked state is affected by the viscosity of the operating oil. The operating oil viscosity changes in accordance with the oil temperature. For example, the oil viscosity becomes lower as the oil temperature increases. The hydraulic pressure generated by the oil pump 64 fluctuates when the oil temperature changes even if the other conditions are constant and is thus instable.

Accordingly, the ECU 70 prevents the duty ratio dvt from being graded in an unnecessary manner such as when the operating oil viscosity is high enough for enabling unlocking (i.e., the lock mechanism 90 actually already being in an unlocked state). As a result, delay in starting the changing of the actual phase vt is avoided. Furthermore, the ECU 70 prevents the duty ratio dvt from not undergoing gradation even though the operating oil is too low to enable unlocking (i.e., the lock mechanism 90 actually not yet being in an unlocked state).

When the oil pump 64 is driven by the engine 10 as in the preferred embodiment, the hydraulic pressure acting on the lock mechanism 90 is affected by the engine speed ne in addition to the oil temperature. In the preferred embodiment, the predetermined value (predetermined speeds r1 and r2) used as a determination reference for determining whether the lock mechanism 90 is in the locked state or the unlocked state is set in accordance with the temperature of the operating oil. In other wards, the predetermined value (predetermined speeds r1 and r2) is set taking into consideration both the oil temperature and the engine speed ne. This improves the determination accuracy.

(9) The lock mechanism 90 performs unlocking based on the hydraulic pressure of the pressure chambers 55 and 56. Accordingly, an actuator for unlocking is unnecessary. This simplifies the structure.

It should be apparent to those skilled in the art that the present invention may be embodied in many other specific forms without departing from the spirit or scope of the invention. Particularly, it should be understood that the present invention may be embodied in the following forms.

In the preferred embodiment, the predetermined value (predetermined speeds r1 and r2), which is used to determine whether the lock mechanism 90 is in a locked state or an unlocked state, is changed in accordance with the oil temperature that affects unlocking. Instead, the predetermined value (predetermined speeds r1 and r2) may be a single fixed value.

In the preferred embodiment, the ECU 70 determines whether the lock mechanism 90 is in the locked state or the unlocked state based on the engine speed ne. Instead, the ECU 70 may determine the state of the lock mechanism 90 based on only the actual phase vt. Further, the position of the lock pin 92 in the receiving hole 91 may be detected by a sensor, and the ECU 70 may determine the state of the lock mechanism 90 based on the detection result of the sensor.

In the preferred embodiment, the lock pin retraction control by the ECU 70 repeatedly grades the duty ratio dvt from the lower limit value "K−α" to the upper limit value "K+γ" when not determining that the lock mechanism 90 is in an unlocked state. Alternatively, the ECU 70 may end the lock pin retraction control once the graded duty ratio dvt reaches the upper limit value so that re-grading is not performed.

In the preferred embodiment, the upper limit value "K+γ" of the gradation range for the lock pin retraction control is smaller than the maximum duty ratio of the variable range of the duty ratio dvt for controlling the OCV 80. However, the maximum duty ratio may be set to the upper limit value.

In the preferred embodiment, lock pin retraction control is performed only when the lock determination means (ECU 70) determines that the lock mechanism 90 is in a locked state. Instead, processing related with the lock determination may be eliminated. More specifically, after grading the duty ratio dvt a predetermined number of times, the ECU 70 may proceed to normal feedback control without performing the lock determination process.

In the preferred embodiment, the holding duty ratio K is included in the duty ratio gradation range for the lock pin retraction control. However, the holding duty ratio K may be excluded from the gradation range. For example, the lower limit value of the gradation range may be set between the holding duty ratio K and the unlocking duty ratio K.

In the preferred embodiment, when the processing for setting the duty ratio dvt in steps S125 and S140 are not performed at all after the process in the flowchart of FIG. 5 starts, the ECU 70 determinates the predetermined duty ratio dvt, which is smaller than "K−α" in step S300. Alternatively, the ECU 70 may determinate the duty ratio dvt having the value of "K−α" in step S300. In this case, the determination result of step S300 would be NO. Thus, the ECU 70 replaces the duty ratio dvt with "K−α+A" in step S330.

In part of the gradation range of the duty ratio dvt that includes the unlocking duty ratio R, the increasing rate of the duty ratio dvt may be the same or higher than other ranges.

In the preferred embodiment, the gradation rate of the duty ratio dvt during lock pin retraction control is set to two increasing rates, the moderate increasing rate corresponding to the predetermined update amount A and the high increasing rate corresponding to the predetermined update amount B. However, there may be any number of increasing rates for grading. Further, the duty ratio dvt may change (increase or decrease) along a curve (e.g., two dimensional curve).

In the lock pin retraction control, the duty ratio dvt may be graded (decreased) in the gradation range from the upper limit value to the lower limit value. Further, in the preferred embodiment, the difference between the upper limit value and the holding duty ratio K is greater than the difference between the lower limit value and the holding duty ratio K. However, the difference between the upper limit value and the holding duty ratio K may be smaller than the difference between the lower limit value and the holding duty ratio K.

The ECU 70 may periodically replace the holding duty ratio K through a learning process with a duty ratio that causes the actual pressure difference between the pressure chambers 55 and 56 to be zero. In this case, it is desirable that the gradation range of the duty ratio dvt for lock pin retraction control is set taking into consideration the error between the duty ratio at which the actual pressure difference between the pressure chambers 55 and 56 is zero and the learned value of the holding duty ratio K. In other words, it is preferable that the actual optimal duty ratio DF be included in the gradation range even if the error is maximum.

The gradation range of the duty ratio dvt in the lock pin retraction control may be smaller than the dispersion range of the unlocking duty ratio R for the actual optimal duty ratio DF. That is, the unlocking duty ratio R may be excluded from the gradation range when a dispersion of the unlocking duty ratio R occurs. Even in such a case, the possibility of the duty ratio dvt matching the actual optimal duty ratio DF is high in comparison to when, for example, the duty ratio dvt is fixed to the unlocking duty ratio R without the gradation.

In the preferred embodiment, the target phase vtt is replaced by a certain predetermined phase d1 when at least one of the two cylinder groups LS and RS is in a locked state and the target phase vtt calculated in step S100 is greater than or equal to the predetermined phase d1. However, if the target phase vtt is smaller than the predetermined phase d1, the target phase vtt may be replaced by a phase other than the predetermined phase d1. The target phase vtt may be replaced by a value which changes within a range less than or equal to the predetermined phase d1. In the preferred embodiment, the ECU 70 must replace the target value vtt with a value greater than or equal to the predetermined phase d2 to enable the shifting to the normal feedback control of step S140 in the flowchart of FIG. 5.

In the preferred embodiment, when the ECU 70 determines that at least one lock mechanism 90 of the two cylinder groups LS and RS is in the locked state, the target phase vtt of the two cylinder groups LS and RS are restricted to within the same range. The preferred embodiment is not limited to this arrangement. As long as the torque fluctuation can be suppressed, the ECU 70 may restrict the target phase vtt of the two cylinder groups LS and RS to a different range.

In the preferred embodiment, the ECU 70 determines whether or not the target phase vtt calculated in step S100 is less than a predetermined phase d1 (process of step S110). When the target phase vtt is less than the predetermined phase d1, the ECU 70 keeps the target phase vtt unchanged. However, the determination process of step S110 may be omitted. In this case, when it is determined that at least one lock mechanism 90 of the two cylinder groups LS and R is in the locked state, the ECU 70 replaces the target phase vtt with the predetermined phase d1 regardless of the size of the target phase vtt calculated in step S100.

When the ECU 70 determines that both lock mechanisms 90 of the two cylinder groups LS and RS are in the locked state, the target phase vtt need not be restricted. That is, the ECU 70 may also restrict the target phase vtt only when it is determined that the one lock mechanism 90 is in the locked state.

In the preferred embodiment, the target phase vtt is restricted to a phase different from the lock phase by having the predetermined phase d1 differ from zero. Alternatively, the target phase vtt also may be set to the lock phase by setting the predetermined phase d1 to zero.

In the VVT control by the ECU 70 (equivalent to the series of processes shown in the flowchart of FIG. 5), the processing of steps S105, S110, and S115 or the process relating to abutment control (for example, steps S120, S125) may be omitted.

In the preferred embodiment, the unlock pressure chamber 97, which communicates with the advance pressure chamber 55, has a greater hydraulic pressure acting surface area in the direction of disengaging of the lock pin 92 from the lock hole 96 than the unlock pressure chamber 94, which communicates with the delay pressure chamber 56. However, the acting surface area of the unlock pressure chamber 97 on the advance side may be less than that of the unlock pressure chamber 94 on the delay side. In this case, the actual optimal duty ratio DF is less than or equal to the holding duty ratio K.

In the preferred embodiment, the lock pin 92 is moved by the hydraulic pressure of the pressure chambers 55 and 56. Alternatively, a hydraulic pressure path may be provided separately from the hydraulic pressure path for supplying hydraulic pressure to the two pressure chambers 55 and 56, and hydraulic pressure source separate from the oil pump 64 may be provided in this hydraulic pressure path, such that hydraulic pressure is provided to the lock pin 92 using this hydraulic pressure source. In this case, the lock mechanism 90 may be set to the unlocked state when the hydraulic pressure acting on the lock pin 92 exceeds a predetermined pressure. Alternatively, the lock mechanism 90 may be set to the unlocked state when the hydraulic pressure acting on the lock pin 92 is less than a predetermined pressure. The preferred embodiment is not limited to using hydraulic pressure inasmuch as, for example, an exclusive actuator such as an electromagnetic actuator or the like may move the lock pin 92. In this case, the actual optimal duty ratio DF is substantially equal to the holding duty ratio K.

In the preferred embodiment, the relative rotation of the vane hub 52 is locked by the engagement of the pin-shaped lock pin 92 and the lock hole 96. The preferred embodiment is not limited to this arrangement inasmuch as the relative rotation of the vane hub 52 may be locked by a non-pin-shaped member.

In the preferred embodiment, although the present invention is applied to a device provided with a lock mechanism 90 for locking the relative rotation of a vane hub 52 at the most delayed position, the invention is not limited to this arrangement. For example, the present invention may be applied to a device provided with a lock mechanism for locking the relative rotation at a position between the most delayed position and the most advanced position.

The present invention also may be provided on the exhaust side in a controller for changing the valve timing of exhaust valves 31 and provided with a VVT on the exhaust camshafts 33 (33L, 33R). The present invention is not limited to controllers for changing only the valve timing of the exhaust valve 31 inasmuch as the invention may also be applied to both the intake side and exhaust side in controllers for changing valve timings for both the intake valve 21 and exhaust valve 31.

The internal combustion engine to which the present invention is applied is not limited to a V-type engine, and may be, for example, a horizontal opposed type engine. Furthermore, the present invention may be applied to engines in which a plurality of cylinders arrayed in series are grouped in a plurality of cylinder groups each having separate camshafts and VVT or an internal combustion engine having a single cylinder.

The number of cylinder groups is not limited to two, and may be, for example, three or more.

The present invention is applied to an internal combustion engine having a plurality of cylinder groups in the preferred embodiment. Alternatively, the present invention may be applied to an internal combustion engine having only one cylinder group using the same camshaft and VVT.

The present examples and embodiments are to be considered as illustrative and not restrictive, and the invention is not to be limited to the details given herein, but may be modified within the scope and equivalence of the appended claims.

What is claimed is:

1. A controller for controlling a valve timing of an internal combustion engine, the internal combustion engine including a crankshaft and a camshaft, the controller comprising:

a variable mechanism including a rotor, rotated synchronously with the crankshaft, and an advance pressure chamber and a delay pressure chamber, which are defined between the rotor and the camshaft and which accommodate a fluid, the variable mechanism changing the rotational phase of the camshaft relative to the rotor in accordance with the difference between the pressure of the fluid in the advance pressure chamber and the pressure of the fluid in the delay pressure chamber so as to vary the valve timing, the pressure difference being set by a variable command value;

a lock mechanism including a projection, arranged on either one of the rotor and the camshaft, and a recess, arranged on the other one of the rotor and the camshaft, the lock mechanism engaging the projection with the recess when the rotational phase of the camshaft matches a predetermined lock phase to lock relative rotation of the camshaft relative to the rotor, wherein the variable mechanism enters a most easily unlocking fluid pressure state when the command value is set to an unlocking command value; and a command value setting means for gradually increasing or decreasing the command value from a first predetermined value to the unlocking command value and then to a second predetermined value so as to unlock the relative rotation of the camshaft.

2. The controller according to claim 1, wherein the most easily unlocking fluid pressure state is a state in which a value obtained by subtracting from a first force, acting to disengage the projection from the recess, a second force, acting in a direction opposite the first direction due to the relative rotation of the camshaft, is maximum.

3. The controller according to claim 1, wherein the command value is varied within a first range including the unlocking command value and a second range excluding the unlocking command value, and the command value setting means increases or decreases the command value more moderately in the first range than in the second range.

4. The controller according to claim 1, further comprising:

a lock determination means for determining whether the lock mechanism is locking the relative rotation of the camshaft, the command value setting means increasing or decreasing the command value from the first predetermined value to the second predetermined value when the lock determination means determines that the relative rotation of the camshaft is locked.

5. The controller according to claim 4, wherein the command value setting means repeatedly increases or decreases the command value from the first predetermined value to the second predetermined value when the lock determination means determines that the relative rotation of the camshaft is locked.

6. The controller according to claim 4, wherein the command value is variable within a predetermined variable range, and the second predetermined value is within the variable range.

7. The controller according to claim 4, wherein the lock mechanism unlocks the relative rotation of the camshaft with the pressure of the fluid acting on the lock mechanism, and the lock determination means determines whether the lock mechanism is locking the relative rotation of the camshaft based on a determination reference while changing the determination reference in accordance with the temperature of the fluid in the lock mechanism.

8. The controller according to claim 4, wherein the lock mechanism is connected to a pressure source driven by the internal combustion engine to unlock the relative rotation of the camshaft with fluid pressure produced by the pressure source, and the lock determination means determines whether the lock mechanism is locking the relative rotation of the camshaft based on whether speed of the internal combustion engine is greater than or equal to a determination reference value.

9. The controller according to claim 8, wherein the lock determination means changes the determination reference value in accordance with the temperature of the fluid in the lock mechanism.

10. The controller according to claim 1, wherein the lock mechanism unlocks the relative rotation of the camshaft with fluid pressure with the pressure fluid acting on the lock mechanism, and the fluid pressure acting on the lock mechanism is produced using the pressure of the fluid in at least one of the advance pressure chamber and the delay pressure chamber.

11. A controller for controlling a valve timing of an internal combustion engine, the internal combustion engine including a crankshaft and a camshaft, the controller comprising:

a variable mechanism including a rotor, rotated synchronously with the crankshaft, and an advance pressure chamber and a delay pressure chamber, which are defined between the rotor and the camshaft and which accommodate a fluid, the variable mechanism changing the rotational phase of the camshaft relative to the rotor in accordance with the difference between the pressure of the fluid in the advance pressure chamber and the pressure of the fluid in the delay pressure chamber so as to vary the valve timing, the pressure difference being set by a variable command value;

a lock mechanism including a projection, arranged on either one of the rotor and the camshaft, and a recess, arranged on the other one of the rotor and the camshaft, the lock mechanism engaging the projection with the recess when the rotational phase of the camshaft matches a predetermined lock phase to lock relative rotation of the camshaft with respect to the rotor, wherein the fluid in the advance pressure chamber and the delay pressure chamber apply a first force to the projection to disengage the projection from the recess, and the variable mechanism enters a state in which a value obtained by subtracting a second force, acting on the projection in a direction opposite the direction of the first force due to the relative rotation of the camshaft, from the first force when the command value is set to an unlocking command value; and a control unit for gradually increasing or decreasing the command value from a first predetermined value to the unlocking command value and then to a second predetermined value so as to unlock the relative rotation of the camshaft.

12. The controller according to claim 11, wherein the control unit increases or decreases the command value while changing an increasing rate or decreasing rate of the command value.

13. A method for controlling a valve timing of an internal combustion engine, the internal combustion engine including a crankshaft, a camshaft, a variable mechanism, and a lock mechanism, the variable mechanism including a rotor, rotated synchronously with the crankshaft, and an advance pressure chamber and a delay pressure chamber, which are defined between the rotor and the camshaft and which accommodate a fluid, wherein the variable mechanism changes the rotational phase of the camshaft relative to the rotor in accordance with the difference between the pressure of the fluid in the advance pressure chamber and the pressure of the fluid in the delay pressure chamber so as to vary the valve timing, the lock mechanism including a projection, arranged on either one of the rotor and the camshaft, and a recess, arranged on the other one of the rotor and the camshaft, wherein the lock mechanism engages the projection with the recess when the rotational phase of the camshaft matches a predetermined lock phase to lock relative rotation of the camshaft with respect to the rotor, the method comprising:

setting the difference between the pressure of the fluid in the advance pressure chamber and the pressure of the fluid in the delay pressure chamber with a variable command value, the variable mechanism entering a most easily unlocking fluid pressure state when the command value is set to an unlocking command value; and gradually increasing or decreasing the command value from a first predetermined value to the unlocking command value and then to a second predetermined value so as to unlock the relative rotation of the camshaft.

14. The method according to claim 13, further comprising:

determining whether the relative rotation of the camshaft is locked;

wherein said gradually increasing or decreasing the command value includes gradually increasing or decreasing the command value from the first predetermined value to the second predetermined value when the relative rotation of the camshaft is locked.

* * * * *